United States Patent
Wakahara et al.

(10) Patent No.: US 6,819,005 B2
(45) Date of Patent: Nov. 16, 2004

(54) CHEMICAL TREATMENT OF HELICAL SPLINES IN STARTER

(75) Inventors: Yasuyuki Wakahara, Kariya (JP); Tomoyuki Yamaguchi, Aichi-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 10/191,567

(22) Filed: Jul. 10, 2002

(65) Prior Publication Data

US 2003/0030282 A1 Feb. 13, 2003

(30) Foreign Application Priority Data

Aug. 8, 2001  (JP) ........................................ 2001-240461

(51) Int. Cl.⁷ .......................... B23P 25/00; H02K 15/10; H02K 15/02; C23C 22/07
(52) U.S. Cl. ........................... 290/1 R; 29/598; 29/458; 148/253; 148/262
(58) Field of Search .................. 29/598, 458; 428/687, 428/457, 464, 472.2, 908.8; 148/243, 253, 262, 246; 427/437, 343, 355; 290/38 R; 310/83, 261

(56) References Cited

U.S. PATENT DOCUMENTS

| | | | |
|---|---|---|---|
| 3,297,493 A | * 1/1967 | Heinz et al. | 148/246 |
| 3,367,142 A | * 2/1968 | Groves et al. | 464/162 |
| 3,373,485 A | * 3/1968 | Nelsen | 29/598 |
| 3,615,890 A | * 10/1971 | Montella | 148/253 |
| 4,033,020 A | * 7/1977 | Hudgens | 29/898.03 |
| 4,113,518 A | * 9/1978 | Henderson | 148/246 |
| 4,904,365 A | * 2/1990 | Kawamura et al. | 204/623 |
| 5,052,235 A | * 10/1991 | Isozumi | 74/7 E |
| 5,130,586 A | * 7/1992 | Miyaji et al. | 310/83 |
| 5,162,683 A | * 11/1992 | Isozumi | 310/83 |
| 5,313,919 A | * 5/1994 | Rao et al. | 123/193.4 |
| 5,325,732 A | * 7/1994 | Vogel | 74/89.44 |
| 5,469,931 A | * 11/1995 | Kawata et al. | 180/379 |
| 5,499,936 A | * 3/1996 | McElroy et al. | 440/83 |
| 5,630,668 A | * 5/1997 | Ikezawa et al. | 384/527 |
| 5,785,771 A | * 7/1998 | Mitchell et al. | 148/213 |
| 5,895,993 A | * 4/1999 | Kajino et al. | 310/83 |
| 5,903,965 A | * 5/1999 | Fletcher et al. | 29/458 |
| 6,634,078 B1 | * 10/2003 | Breese | 29/527.2 |

FOREIGN PATENT DOCUMENTS

| | | |
|---|---|---|
| JP | U 1-130074 | 9/1989 |
| JP | 02000161377 A | * 6/2000 |

OTHER PUBLICATIONS

U.S. patent application Ser. No. 09/977,234, Murata et al., filed Oct. 16, 2001.

* cited by examiner

Primary Examiner—Joe Waks
Assistant Examiner—Julio Gonzalez
(74) Attorney, Agent, or Firm—Oliff & Berridge PLC

(57) ABSTRACT

In a starter, a barrel of a one-way clutch fits on an outer circumference of an output shaft. The barrel and the output shaft have spline portions and engage with each other. A chemical conversion coating is formed on at least one of the spline portion of the output shaft and the spline portion of the barrel. Microscopic asperities of a dimension within 10 μm are formed on the surface of the chemical conversion coating to hold grease applied on the spline portions. The chemical conversion coating is formed by immersing the spline portion in a chemical treatment solution, such as zinc phosphate solution. Alternatively, the asperities can be directly formed on the spline portions.

11 Claims, 4 Drawing Sheets

CHEMICAL TREATMENT OF HELICAL SPLINES IN STARTER

CROSS REFERENCE TO RELATED APPLICATION

This application is based on Japanese Patent Application No. 2001-240461 filed on Aug. 8, 2001, the disclosure of which is incorporated herein by reference.

FIELD OF THE INVENTION

The present invention relates to a starter having a one-way clutch that slides on an output shaft along helical splines for transmitting rotation of the output shaft to a pinion.

BACKGROUND OF THE INVENTION

In a starter disclosed in JP-U-1-130074, rotation of an armature is transmitted to a pinion through a one-way clutch. The one-way clutch is provided with a cylindrical-shaped barrel. The barrel is engaged with an outer circumference of an output shaft extending from a rotary shaft of the armature through helical splines and is slidable thereon in an axial direction.

In general, helical splines of an output shaft are not formed by cutting, but formed by rack rolling to improve productivity. Also, helical splines of a barrel of a one-way clutch are generally formed by broaching or emboss pressing to improve productivity. However, manufacturing quality of the splines is likely to be lessened as compared with that of helical splines formed by cutting.

If the manufacturing quality of the splines is low, slidability between the splines becomes worse. For example, if loads are applied on the splines due to shock when a pinion meshes with a ring gear, splines are likely to adhere (bite) with each other.

SUMMARY OF THE INVENTION

The present invention is made in view of the above problem, and it is an object of the present invention to provide a starter having enhanced productivity.

It is another object of the present invention to provide a starter in which slidability of spline portions is improved.

It is further another object of the present invention to provide a method of chemical treatment for forming a chemical conversion coating to enhance slidability of helical spline portions of a starter.

According to the present invention, a starter has an output shaft for outputting a rotation force of a motor, and a one-way clutch provided with a barrel fitted on the output shaft for transmitting rotation of the output shaft to a pinion. The output shaft and the barrel include spline portions having helical splines and engage with each other. Chemical conversion coating is formed on at least one of the spline portion of the output shaft and the spline portion of the barrel. Microscopic asperities are formed on the surface of the chemical conversion coating.

According to this structure, grease applied on the spline portions is held by the microscopic asperities of the chemical conversion coating. Therefore, oil-holding capacity is improved and durability against wear is increased. Further, with the chemical conversion coating, the spline portions are prevented from rusting even under fatigue environments of the water and dirt. Accordingly, slidability can be ensured between the output shaft and the barrel.

Alternatively, microscopic asperities can be directly formed on at least one of the spline portion of the output shaft and the spline portion of the barrel. With this, grease applied on the spline portions is held by microscopic asperities of the spline surfaces. Therefore, oil-holding capacity can be improved and durability against wear can be increased. Further, because oil film breakage can be decreased with the improvement of the oil-holding capacity, it is possible to minimize an area where a base material of the output shaft press-contacts a base material of the barrel, thereby ensuring slidability.

A method of chemical treatment for forming the chemical conversion coating on the spline surfaces includes steps of washing the spline portion for removing dirt, chemical treating the spline portion by immersing in a chemical treatment solution and removing the chemical treatment solution from the spline portion by washing. With this process, the chemical conversion coating can be properly formed on the spline surfaces.

BRIEF DESCRIPTION OF THE DRAWINGS

Other objects, features and advantages of embodiments will become more apparent from the following detailed description made with reference to the accompanying drawings, in which.

DETAILED DESCRIPTION OF PREFERRED EMBODIMENT

Preferred embodiments of the present invention will be described hereinafter with reference to the drawings.

(First Embodiment)

Figure 1:
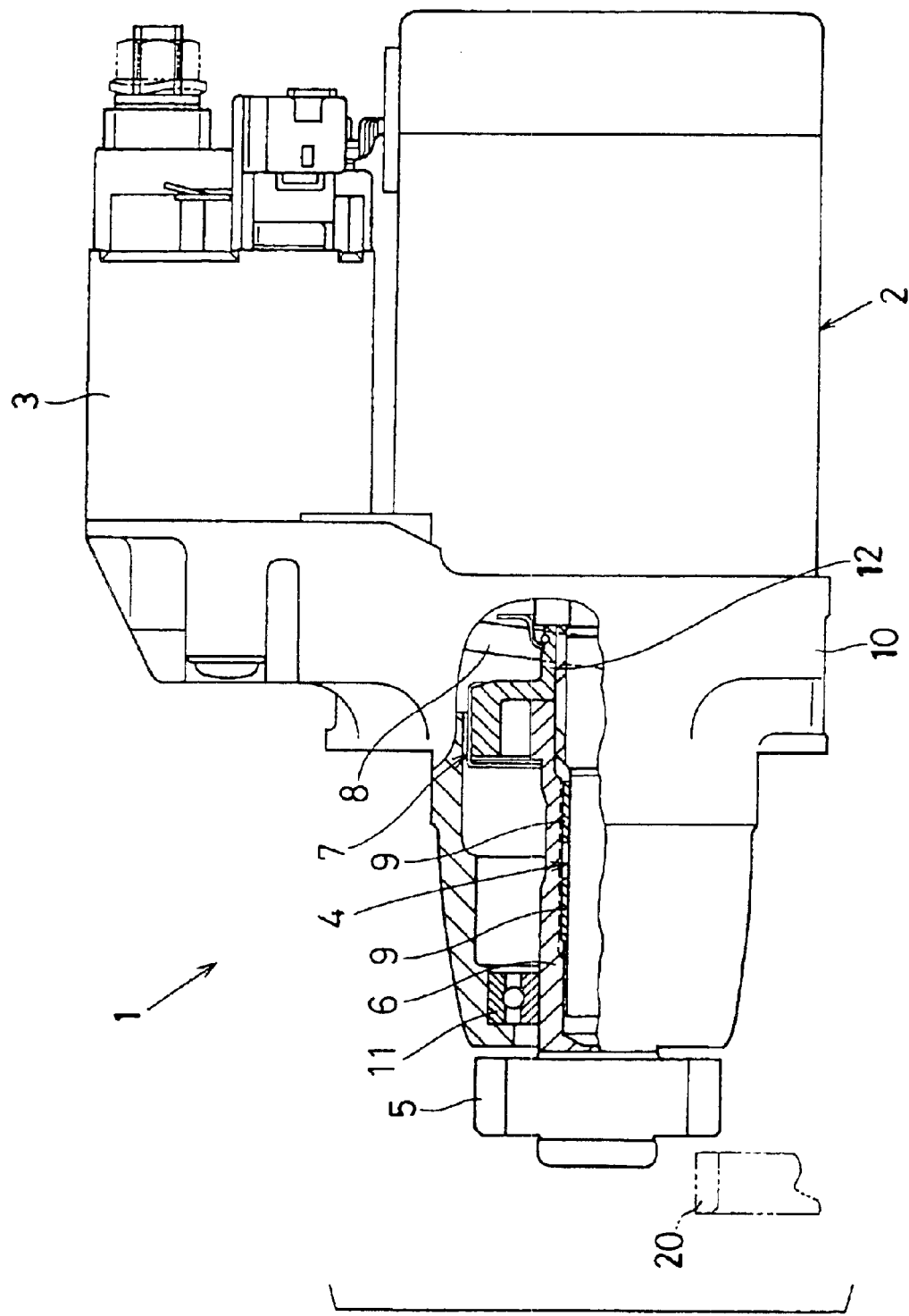
FIG. 1 is a schematic diagram of a starter, partially in cross-section, according to the first embodiment of the present invention.

Referring to FIG. 1, a starter 1 has a motor 2 for generating a rotation force, a magnet switch 3 to connect and disconnect a motor contact (not sown) provided in an electric circuit of the motor 2, an output shaft 4 for outputting the rotation force of the motor 2, a tube 6 supporting a pinion 5, a one-way clutch 7 for transmitting rotation of the output shaft 4 to the tube 6.

The motor 2 is a well-known d.c.motor. When a key switch (not shown) is turned on and the motor contact in the magnet switch 3 is connected, an armature (not shown) is energized to rotate. A plunger (not shown) is provided in the magnet switch 3. The motor contact in the magnet switch 3 is connected and disconnected with movement of the plunger. A pull-in force generated in the magnet switch 3 for moving the plunger is transmitted to the one-way clutch 7 through a lever 8.

Figure 3:
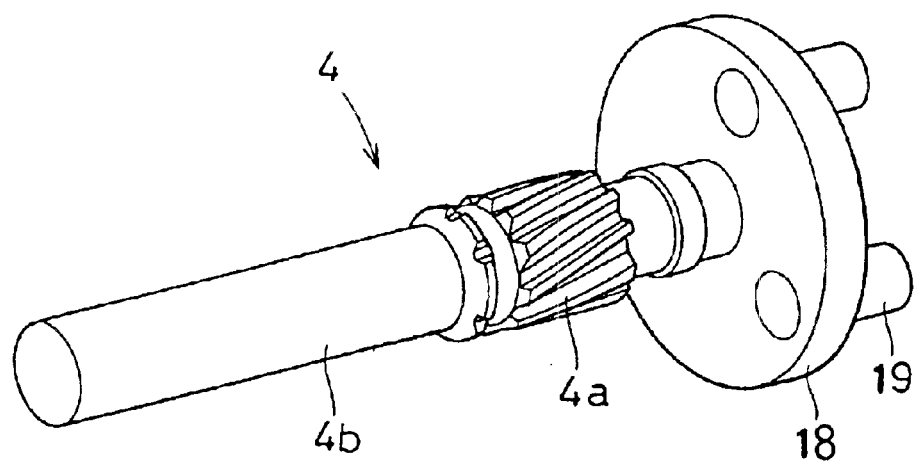
FIG. 3 is a perspective view of an output shaft according to the first embodiment of the present invention.

The output shaft 4 is arranged in a coaxially aligned manner with a rotary shaft (not shown) of the motor 2. The rotation of the motor 2 is transmitted to the output shaft 4 through a speed reduction device (not shown), such as a planetary speed reduction gear device. The output shaft 4 has a spline portion having helical splines 4a and a shaft portion 4b, as shown in FIG. 3.

Figure 2:
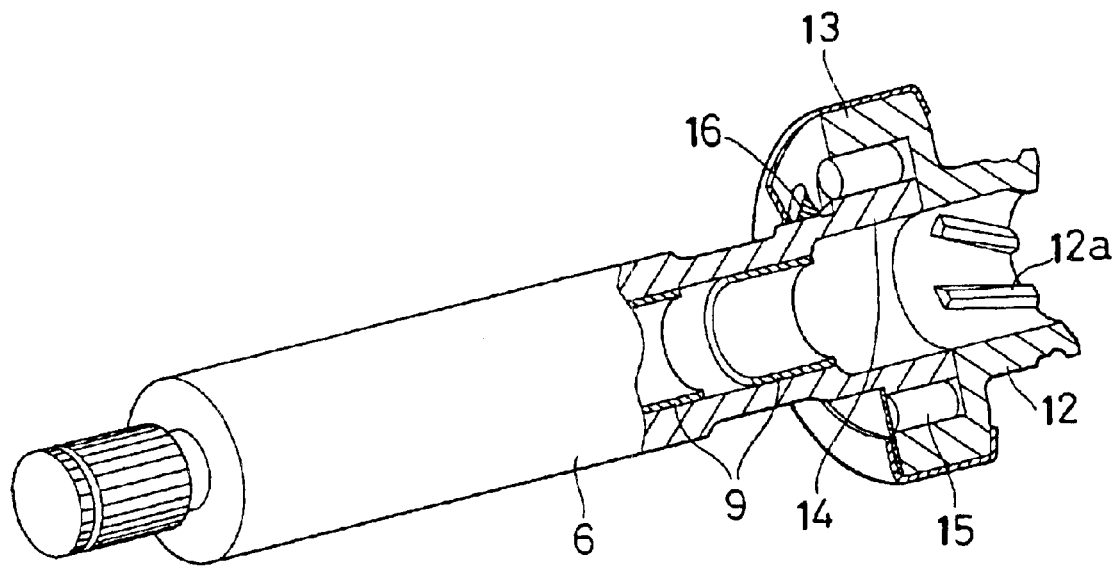
FIG. 2 is a perspective view of a one-way clutch, partially in cross-section, according to the first embodiment of the present invention.

The tube 6 is formed into a cylindrical shape other than the front end (left side end in FIG. 2). A bearing 9 is press-fitted in the inner periphery of the cylindrical portion of the tube 6. The tube 6 fits on the outer circumferential surface of the shaft portion 4b of the output shaft 4 through the bearing 9. The bearing 9 slide-contacts the shaft portion 4b of the output shaft 4. The outer circumferential surface of the cylindrical portion is supported by bearings 11 fixed in a front case 10, as shown in FIG. 1. The pinion 5 is combined with the front end of the tube 6 through splines to rotate with the tube 6. The pinion 5 is restricted from moving in an axial direction with respect to the tube 6.

The one-way clutch 7 transmits the rotation of the output shaft 4 to the tube 6. Also, the one-way clutch 7 interrupts a motive power transmission between the output shaft 4 and the tube 6. Therefore, the armature is prevented from overrunning when the rotation of the tube 6 becomes faster than that of the output shaft 4 by the engine start. The one-way clutch 7 has a clutch outer 13 for receiving the rotation of the output shaft 4 through a barrel 12, a clutch inner 14 integrated with the tube 6, a roller 15 interposed between the outer 13 and the inner 14, a spring 16 for biasing the roller 15 and the like, as shown in FIG. 2.

Figure 5:
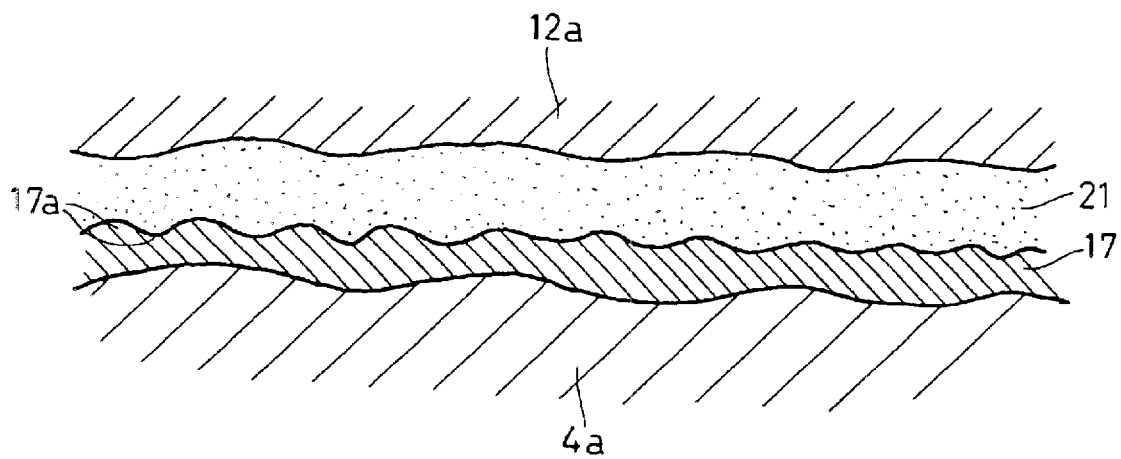
FIG. 5 is an enlarged cross-sectional view of spline portions according to the first embodiment of the present invention.

The barrel 12 has a substantially cylindrical shape and a spline portion having helical splines 12a are formed in the inner circumference. The barrel 12 is fitted on the outer periphery of the output shaft 4 such that the splines 12a engage with the splines 4a of the output shaft 4. Chemical conversion coating 17 is formed on at least one of the splines 12a of the barrel 12 and the splines 4a of the output shaft 4, as shown in FIG. 5.

Figure 4A:
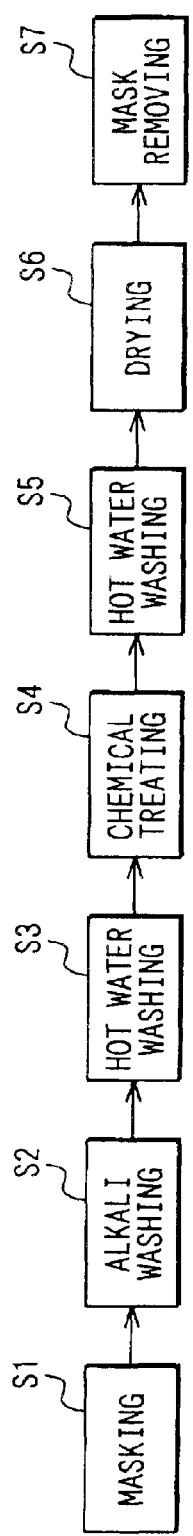
FIG. 4A is a block diagram showing a process of a chemical treatment according to the first embodiment of the present invention.

Here, a method of chemical treatment for forming the chemical conversion coating 17 is described hereinafter. FIG. 4A is a block diagram showing a process of the chemical treatment. The process proceeds from steps S1 to S7.

It is noted that the output shaft 4 is heat-treated before the chemical treatment, because the chemical conversion coating 17 is broken if the output shaft 4 is heat-treated after the chemical treatment. The output shaft 4 is provided with a disc-shaped carrier 18 on its rear end as a sub-assembly, as shown in FIG. 2. Further, pins 19 for axially supporting planetary gears of the planetary speed reduction gear device are press-fitted to the carrier 18.

Figure 4C:
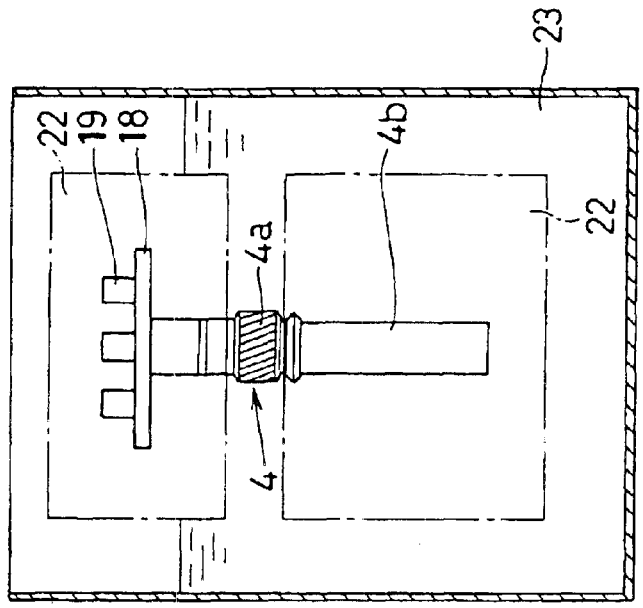
FIG. 4C is a schematic view illustrating a step of immersing the output shaft in a chemical bath according to the first embodiment of the present invention.
Figure 4B:
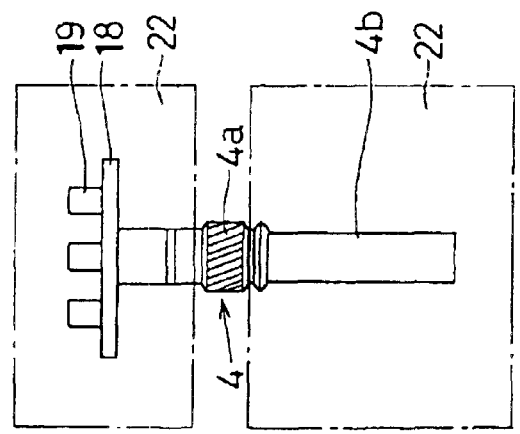
FIG. 4B is a schematic view illustrating a step of masking the output shaft according to the first embodiment of the present invention.

First, at step S1, the output shaft 4 except for the spline portion is masked with masks 22, as shown in FIG. 4B. At step S2, the spline portion is washed with alkali solution to remove dirt on the spline surface. Then, at step S3, the spline portion is washed with hot water to remove the alkali solution. At step S4, the spline portion is immersed in a chemical bath 23 of a chemical treatment solution, such as zinc phosphate solution and manganese phosphate solution, for a predetermined period (for example, 4 to 7 minutes), as shown in FIG. 4C.

At step S5, the output shaft 4 is removed from the chemical bath 23 and washed with hot water to remove the chemical treatment solution. At step S6, the output shaft 4 is dried to remove water from the spline portion. Then, at step S7, the masks 22 are removed from the output shaft 4.

In this way, the chemical conversion coating 17 is formed on the surfaces of the splines 4a. The surface of the chemical conversion coating 17 has microscopic asperities 17a of a dimension within 10 μm, as shown in FIG. 5. Although the chemical conversion coating 17 is formed on the splines 4a of the output shaft 4 in the above description, it is also possible to form the chemical conversion coating 17 on the splines 12a of the barrel 12 in a similar manner.

Next, an operation of the starter 1 is described.

When the key switch is turned on, the motor contact of the magnet switch 3 is connected so that the armature is energized and starts rotating. The rotation of the armature is decelerated with the speed reduction device and transmitted to the output shaft 4. The rotation is further transmitted to the tube 6 from the output shaft 4 through the one-way clutch 7.

When the pull-in force of the magnet switch 3 is transmitted to the one-way clutch 7 through the lever 8, the tube 6 is pushed forward (left side in FIG. 1) on the output shaft 4 with the one-way clutch 7, so that the pinion 5 meshes with the ring gear 20 and the ring gear 20 starts rotating.

After the engine starts by cranking, when the key switch is turned off, the pull-in force of the magnet switch 3 is extinguished. Therefore, the plunger is returned to a stationary position by a return spring (not shown) provided in the magnet switch 3. When the movement of the plunger is transmitted to the one-way clutch 7 through the lever 8, the tube 6 is pulled backward (right side in FIG. 1) on the output shaft 4 with the one-way clutch 7, so the pinion 5 is separated from the ring gear 20 and returned to the stationary position shown in FIG. 1. Because the motor contact is disconnected in accordance with the returning of the plunger, electric current to the armature is interrupted and the armature stops rotating.

According to the starter 1 of the present embodiment, the chemical conversion coating 17 is formed on at least one of the splines 4a of the output shaft 4 and the splines 12a of the barrel 12. Further, the surface of the chemical conversion coating 17 has the microscopic asperities 17a of the dimension within 10 μm. Therefore, grease 21 applied between the spline portions of the output shaft 4 and the barrel 12 is held by the asperities 17a. Accordingly, it is possible to improve oil-holding capacity therebetween and to decrease oil film breakage. Furthermore, durability against wear can be increased.

As a result, it is possible to minimize that base materials of the splines 4a and 12a contact with each other when loads are applied on the splines 4a and 12a engaging with each other, that is, when the pinion 5 meshes with the ring gear 20. Therefore, even when the splines 4a of the output shaft 4 and the splines 12a of the barrel 12 have tooth form errors or total helix errors, adhering or biting of the splines 4a and 12a can be decreased. Accordingly, slidability of the splines 4a against the splines 12a can be improved. Further, since the oil film breakage is suppressed by the chemical conversion coating 17 on the surfaces of the splines 4a and 12a, the splines 4a and 12a can be prevented from rusting even under hostile environments of the water and dirt.

According to the method of the chemical treatment of the present embodiment, the shaft portion 4b of the output shaft 4 is masked with the mask 22 at the step of masking. However, the masking of the shaft portion 4b can be eliminated. In this case, the chemical conversion coating 17 can be formed on the spline portion and the outer circumferential surface of the shaft portion 4b, thereby improving the slidability of the shaft portion 4b against the bearing 9.

(Second Embodiment)

Figure 6:
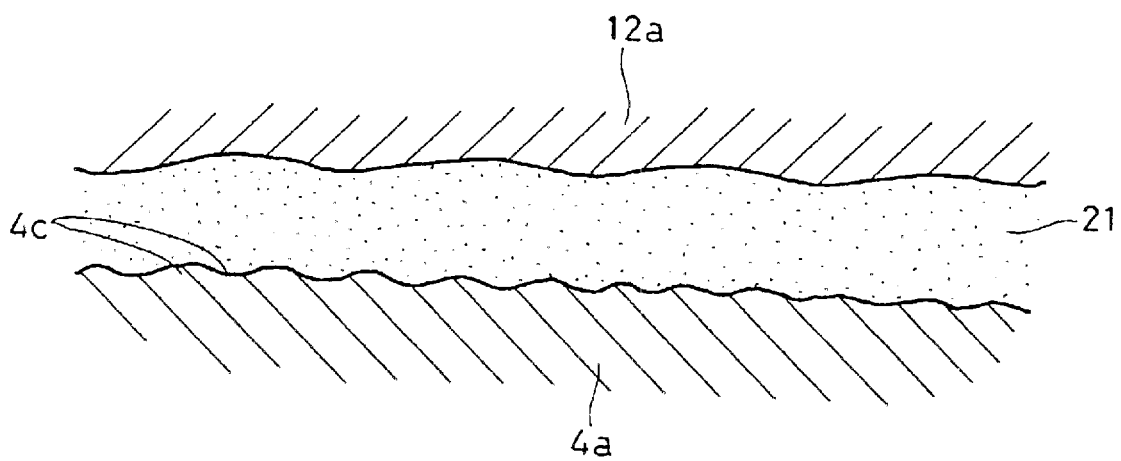
FIG. 6 is an enlarged cross-sectional view of spline portions according to the second embodiment of the present invention.
Figure 7:
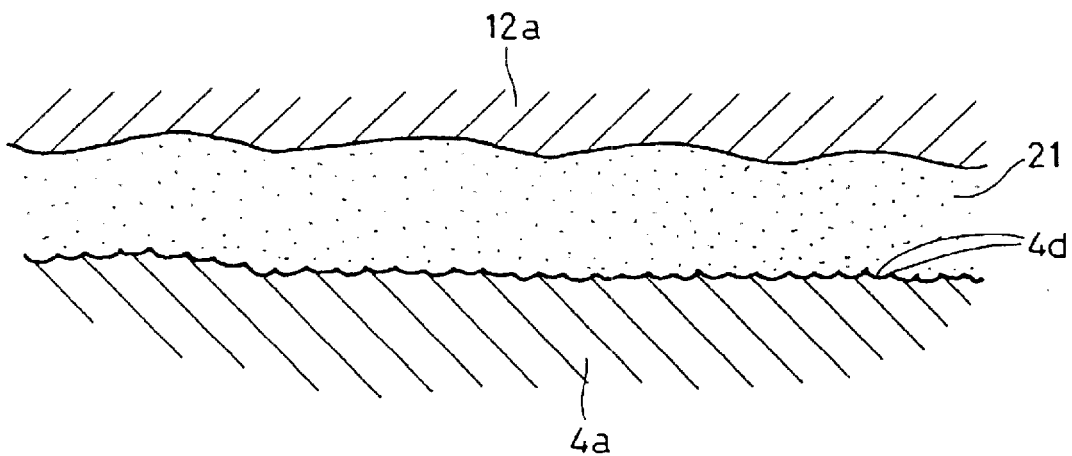
FIG. 7 is an enlarged cross-sectional view of spline portions according to the third embodiment of the present invention.

In the second embodiment, microscopic asperities 4c are directly formed on the surfaces of the splines 4a of the output shaft 4, as shown in FIG. 6. Specifically, the spline portion of the output shaft 4 is treated by acid washing so that the surfaces of the splines 4a are roughened and have the asperities of a dimension within 10 μm.

Accordingly, similar to the first embodiment, the oil-holding capacity between the splines 4a and 12a can be improved. Therefore, the oil film breakage is decreased. As a result, it is possible to minimize an area where the base materials of the splines 4a and 12a of the output shaft 4 and the barrel 12 press-contact with each other when the loads are applied on the spline portions of the output shaft 4 and the barrel 12. Thus, the splines 4a and 12a are restricted from adhereing or biting with each other. Accordingly, slidability can be ensured and durability against wear can be improved.

Further, since the oil film breakage of the spline portions is decreased, the spline portions are prevented from rusting even under the hostile environments of the water or the dirt. Here, the microscopic asperities can be directly formed on the splines 12a of the barrel 12.

(Third Embodiment)

In the third embodiment, microscopic asperities 4d are directly formed on the surfaces of the splines 4a of the output shaft 4. Specifically, the microscopic asperities 4d of a dimension within 10 μm are formed on the surfaces of the splines 4a by a mechanical process, such as shot-peening and the like.

Also in this case, advantages similar to those of the second embodiment can be obtained. Further, the surfaces of the splines 4a are transformed, thereby increasing life against fatigue. Also, it is possible to form the asperities directly on the splines 12a of the barrel 12 in the third embodiment.

The present invention should not be limited to the disclosed embodiments, but may be implemented in other ways without departing from the spirit of the invention.

What is claimed is:

1. A starter for starting an engine by transmitting a rotation force of a motor to a ring gear through a pinion, the starter comprising:

an output shaft for outputting the rotation force of the motor; and a one-way clutch having a barrel fitted on the output shaft for transmitting rotation of the output shaft to the pinion, wherein the output shaft and the barrel have helical spline portions and engage with each other, at least one of the spline portion of the output shaft and the spline portion of the barrel has a chemical conversion coating, and a surface of the chemical conversion coating has microscopic asperities and further wherein a dimension of the microscopic asperities is equal to or less than 10 μm.

2. The starter according to claim 1, wherein the chemical conversion coating is formed by immersing the spline portion in a chemical treatment solution.

3. The starter according to claim 2, wherein the chemical treatment solution includes zinc phosphate.

4. The start according to claim 2, wherein the chemical treatment solution includes manganese phosphate.

5. A starter for starting an engine by transmitting a rotation force of a motor to a ring gear through a pinion, the starter comprising:

an output shaft for outputting the rotation force of the motor; and a one-way clutch having a barrel fitted on the output shaft for transmitting rotation of the output shaft to the pinion, wherein the output shaft and the barrel have helical spline portions and engage with each other, and at least one of the helical spline portion of the output shaft and the helical spline portion or the barrel hits microscopic asperities and further wherein a dimension of the microscopic asperities is equal to or less than 10 μm.

6. The starter according to claim 5, wherein the helical spline portions have a surface treated by acid washing, and the asperities are formed on the surface.

7. The starter according to claim 5, wherein the helical spline portions have a mechanically processed surface, and the asperities are formed on the surface.

8. The starter according to claim 5, wherein the helical spline portions have a surface processed by shot peening, and the asperities are formed on the surface.

9. The starter according to claim 5, wherein at least one of the helical spline portion of the output shaft and the helical spline portion of the barrel has a chemical conversion coating, wherein the microscopic asperities are formed on the surface of the chemical conversion coating.

10. The starter according to claim 9, wherein the chemical conversion coating is formed by immersing the at least one of the helical spline portions in a chemical treatment solution.

11. The starter according to claim 10, wherein the chemical treatment solution includes zinc phosphate.

* * * * *